(12) United States Patent
Aaroe

(10) Patent No.: US 11,623,672 B2
(45) Date of Patent: Apr. 11, 2023

(54) SYSTEM FOR DETECTING EVENTS OR SITUATIONS HAVING ASSOCIATED PATTERNS OF ACOUSTIC VIBRATIONS IN A TRAIN RAIL AND VIBRATION DETECTOR UNIT FOR THIS SYSTEM

(71) Applicant: NEXT GENERATION RAIL TECHNOLOGIES S.L., Malaga (ES)

(72) Inventor: Richard Aaroe, Campanillas-Malaga (ES)

(73) Assignee: NEXT GENERATION RAIL TECHNOLOGIES S.L., Malaga (ES)

( * ) Notice: Subject to any disclaimer, the term of this patent is extended or adjusted under 35 U.S.C. 154(b) by 248 days.

(21) Appl. No.: 16/757,302

(22) PCT Filed: Oct. 17, 2018

(86) PCT No.: PCT/EP2018/078442
§ 371 (c)(1),
(2) Date: Apr. 17, 2020

(87) PCT Pub. No.: WO2019/076993
PCT Pub. Date: Apr. 25, 2019

(65) Prior Publication Data
US 2021/0122401 A1    Apr. 29, 2021

(30) Foreign Application Priority Data
Oct. 17, 2017  (EP) ..................................... 17382697

(51) Int. Cl.
*B61L 23/04*   (2006.01)
*B61K 9/10*    (2006.01)
(Continued)

(52) U.S. Cl.
CPC .............. *B61L 23/044* (2013.01); *B61K 9/12* (2013.01); *B61L 23/041* (2013.01);
(Continued)

(58) Field of Classification Search
CPC ...... B61L 23/04; B61L 23/041; B61L 23/042; B61L 23/044; B61L 23/047;
(Continued)

(56) References Cited

U.S. PATENT DOCUMENTS 5,907,294 A * 5/1999 Welte ...................... B61L 23/06
340/901
5,988,569 A * 11/1999 Zhang ...................... B60D 1/62
248/65

(Continued)

FOREIGN PATENT DOCUMENTS

CA       2 270 066        10/2000
DE   102012208761 A1 * 11/2012 ......... B60C 23/0488
(Continued)

OTHER PUBLICATIONS

PCT International Search Report and Written Opinion, European Patent Office, PCT Applic. No. PCT/EP2018/078442, dated Jan. 21, 2019, 11 pages.

*Primary Examiner* — Herbert K Roberts

(57) ABSTRACT

System (1) for detecting events or situations having associated patterns of acoustic vibrations in a train rail (2), which comprises a vibration detector unit (3) provided with an acoustic sensor (31) and attached to the rail (2) that can sense the acoustic vibrations transmitted through the rail (2) and a main assembly (4) connected to the vibration detector unit (3), wherein the vibration detector unit (3) comprises a processor (32) and the main assembly (4) comprises a control unit (41), the processor (32) comprising stored patterns corresponding to known events, the processor (32) being configured to preprocess the vibrations transmitted to the rail (2), to determine if the vibrations correspond to a stored pattern and, if the vibrations correspond to a stored
(Continued)

pattern, send to the control unit (41) a signal associated to the event. The invention also refers to the vibration detector unit (3) itself.

19 Claims, 10 Drawing Sheets

(51) Int. Cl.
  *G01H 11/08* (2006.01)
  *B61K 9/12* (2006.01)
  *B61L 25/02* (2006.01)
  *B61L 27/70* (2022.01)
  *G01K 13/00* (2021.01)

(52) U.S. Cl.
  CPC ............ *B61L 25/025* (2013.01); *B61L 27/70* (2022.01); *G01H 11/08* (2013.01); *G01K 13/00* (2013.01)

(58) Field of Classification Search
  CPC ...... B61L 23/048; B61L 23/06; B61L 29/284; B61K 9/08; B61K 9/10; G01H 11/06; G01H 11/08; G01H 1/04; G01H 1/06; G01H 1/08; G01H 1/12; G01H 1/14; G01H 1/16; G01P 1/02; G01P 1/023; G01P 1/026
  See application file for complete search history.

(56) References Cited

U.S. PATENT DOCUMENTS

| | | | |
|---|---|---|---|
| 2006/0076461 A1* | 4/2006 | DeRose | B61K 9/00 246/122 R |
| 2014/0172205 A1* | 6/2014 | Ruhland | B61L 27/53 701/19 |
| 2015/0284015 A1* | 10/2015 | Lingvall | B61L 29/28 246/124 |

FOREIGN PATENT DOCUMENTS

| | | | |
|---|---|---|---|
| WO | WO 2012/036565 | 3/2012 | |
| WO | WO-2012131683 A2 * | 10/2012 | ............ B61L 1/165 |
| WO | WO-2017190734 A2 * | 11/2017 | ............ B61L 1/08 |

* cited by examiner

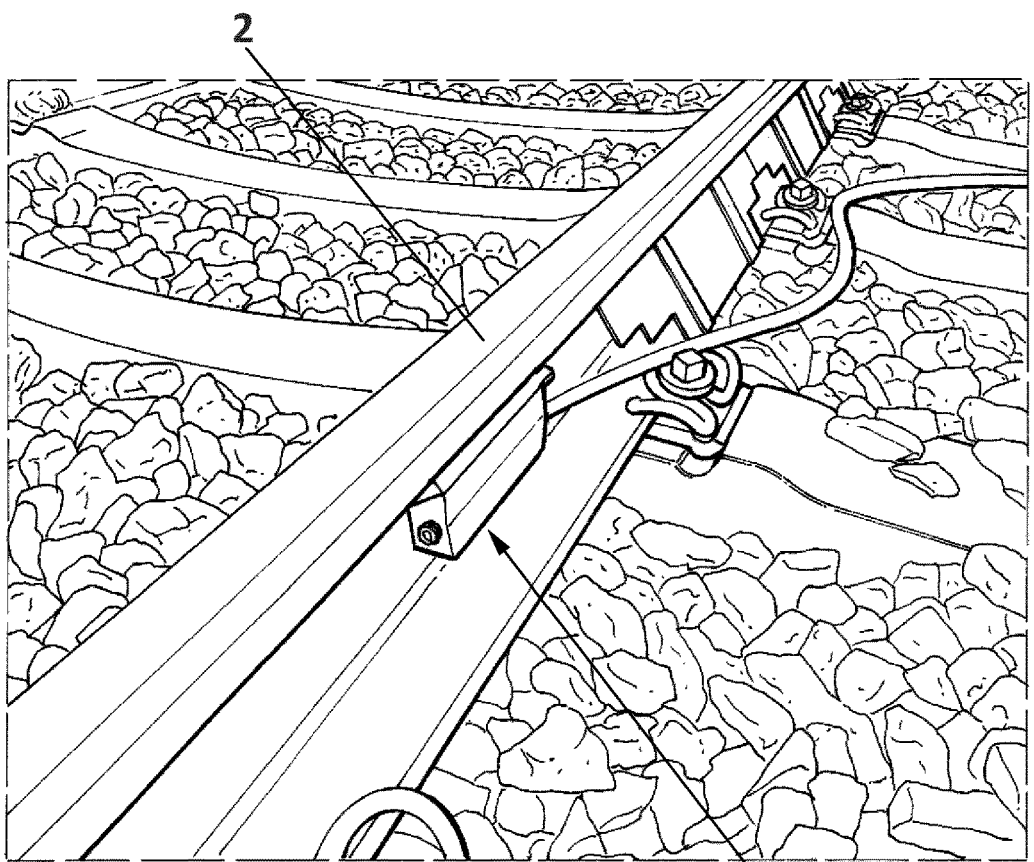
FIG. 3
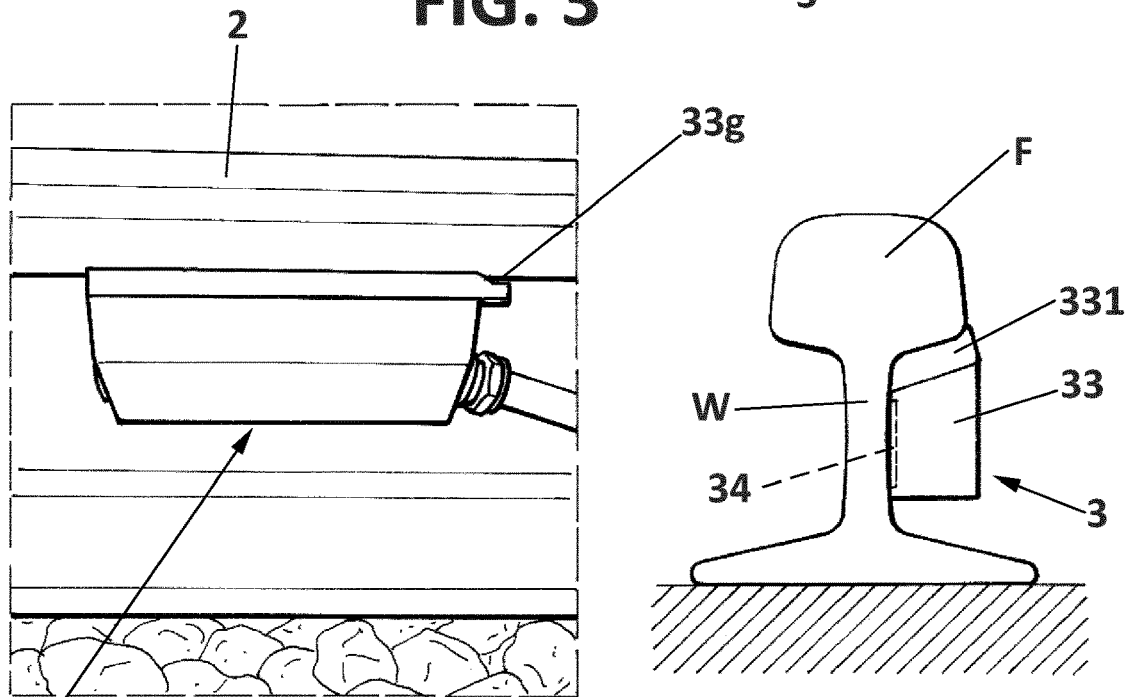
FIG. 4
FIG. 5

SYSTEM FOR DETECTING EVENTS OR SITUATIONS HAVING ASSOCIATED PATTERNS OF ACOUSTIC VIBRATIONS IN A TRAIN RAIL AND VIBRATION DETECTOR UNIT FOR THIS SYSTEM

TECHNICAL FIELD

The present invention relates to a system for detecting events or situations having associated patterns of acoustic vibrations in a train rail, and to a vibration detector unit to be used in said system. They are intended in particular to provide a modular, versatile, and reliable system, while being cost efficient.

STATE OF THE ART

Known in the art are the systems for detecting events or situations having associated patterns of acoustic vibrations in a train rail, which comprises at least a vibration detector unit (also identified in this text as VDU) destined to be attached to the rail such that it can sense the acoustic vibrations transmitted through the rail and a main assembly (also identified in the present text as MA) connected to the vibration detector unit, the vibration detector unit comprising an acoustic sensor.

This is disclosed for example in IN01274CH2008A which discloses the general principle of sensing vibrations in rails for warning.

JP4113969A discloses a device for detecting vibrations in railways by using a magnetic sensor.

JP4113970A discloses a device for detecting vibrations in railways by using a piezoelectric sensor.

DE4214271A discloses systems based on electro-acoustic transducers acting as noise sensors, which can trigger alarms. To this end the signal is conditioned and then connected to a loudspeaker for reliable warning of approaching danger.

RU97114126A discloses a siren approaching trains for unguarded crossings containing acoustic vibration transducer. When the train is coming over the track, a vibration is produced in the track. The sensor connected near the unguarded level crossing senses the vibration. The vibration will be increased when the train comes very near to the sensor and decreased when the train is away from the sensor. The signal from the sensor is given to a microcontroller. The microcontroller converts the analogue signal to digital signal and according to the signal, it sends signal to the display and siren. Thus the user can easily know the distance of the train and will be alert.

Known are also the axle counters, based on terminals connected to each rail. These are active systems, since they are based in generating an exciting signal and then sense the reaction of the rails to the exciting signal.

Therefore, the general principle of acoustic or vibration sensors on train rails is well known, with the aim of detecting the arrival of the train well enough to generate warnings, to act in level steps, etc. A clear advantage of these devices, with respect to the active devices, is that they do not require the generation of a signal on the track, but are purely passive.

Now, the patterns of vibration associated with the different events and situations that can occur in one way are very complex, and depend on many factors. Their great complexity implies that the treatment of the signals is also very complex, which implies a great capacity of calculation and information management, that must be optimized so that it takes the minimum time to be able to react.

In particular, the information must first pass from the rail to the sensor, then to a processor, then to the warning or drive systems.

And for this it is necessary that the management of this information is optimal, which, with the topology and structure of the current devices, is not.

Another aspect to be improved in known devices is that the vibration sensors must be used in environments where operating conditions are very harsh, so they must be adequately protected. But high protection often implies barriers to signals, which cannot then be well received, which could give rise to losses, erroneous signals, etc.

Therefore, it is necessary to guarantee two properties simultaneously: good protection of the components and an optimal transmission of the signals from the rail to the sensor.

In addition, these aspects should be enhanced with a device that can be easily incorporated into any type of standard rail, with the minimum possible intervention and minimum manufacturing and installation costs.

CA 2 270 066 A1 discloses a railway rail acoustic rockfall detector and WO 2012-036565 A1 discloses a system and method for early train detection.

DESCRIPTION OF THE INVENTION

For overcoming the mentioned drawbacks the present invention proposes a system for detecting events or situations having associated patterns of acoustic vibrations in a train rail, which comprises at least a vibration detector unit destined to be attached to the rail such that it can sense the acoustic vibrations transmitted through the rail and a main assembly connected to the vibration detector unit, the vibration detector unit comprising an acoustic sensor, wherein the vibration detector unit comprises a processor and the main assembly comprises a control unit, the processor comprising stored patterns corresponding to known events, the processor being configured to preprocess the vibrations transmitted to the rail, to determine if the vibrations correspond to a stored pattern and, if the vibrations correspond to a stored pattern, send to the control unit a signal associated to the event.

This structure has shown to be optimal, since each analysis/calculation step is done in the most appropriate place. In the same place where the signals are collected, a first analysis and the generation of signals containing information about the event or situation are carried out. (as will be seen later, only untreated information is sent when this does not correspond to pattern—also known as security mode). This information is sent to the main assembly, which can already manage that information to generate warnings or action orders.

In addition, the space occupancy requirements of the VDU are optimal, since although it may be larger than a simple sensor (because it implies a processor or preprocessor), it still has a size that allows it to be easily arranged on any standard rail.

Another advantageous aspect is that the resulting structure is modular. There can be as many VDUs as needed in a specific area, easily connectable to a common main assembly.

In some embodiments, the processor is configured to send to the control unit the data associated with the vibrations for further analysis if the vibrations do not correspond to a stored pattern.

In this way, a secure system is available and allows self-learning.

In some embodiments, the events or situations can include a broken rail, works on or near the rails, detecting derailment causing circulation of dragging equipment, rockslides, avalanches, circulation of vehicles with flat wheel defect and train approach.

In some embodiments, the acoustic sensor is an accelerometer, a microphone or a piezo electric sensor.

Essentially, the sensor must be able to identify the weight of any rolling stock moving on the track, a sensor detecting rising and shrinking water levels identifying flooding and wash-outs. Each of the sensors will use the same main assembly for final processing and messaging purposes.

In some embodiments, the acoustic sensor has a sensing range comprised between 0 and 140 KHz.

It has been possible to determine that the events of interest for the application of the system occur in these frequency ranges.

In some embodiments, the system comprises at least two vibration detector units, each one connected to one of the rails of a track.

In some embodiments, the vibration detector unit and the main assembly are interconnected, the connections being implemented with cables or wirelessly.

In the case of a wireless connection, the communication is encrypted and secured according to accepted standards.

In some embodiments, the vibration detector unit is powered through harvesting or by the main assembly through cables and the main assembly is powered through local grid, solar panels, wind power, any green energy resources.

In some embodiments, the control unit comprises a control card, the control card being arranged to be separately removed and changed.

Each control card is an independent physical card connected in the main assembly by a bus and each control card can be separately removed and changed without the system needed to be recalibrated.

In some embodiments, the main assembly comprises an information and diagnosis unit destined to display real time data about the system and its performance.

The diagnostic unit will enable extremely cost-beneficial maintenance performance since any authorised personal immediately can identify the exact condition of any installed system at the location in real time.

In some embodiments, the main assembly comprises an I/O unit destined to route data coming from the vibration detection unit outside of the system.

In some embodiments, the vibration detection unit comprises other sensors, such as a temperature sensor.

The sensors are connected on the same cable line without using a separate cable for the various types of sensors. This feature guarantees the minimum type and amount of cabling going from a sensor-chain into the main assembly.

In some embodiments the vibration detection unit is enclosed in a box comprising a lower part and an upper part, wherein the lower part defines a volume for housing components and is destined to be adjoined to an upper web of the rail and the upper part is a cover of the box, the upper part having an upper profile having the shape of an upper flange lower surface of the rail, the acoustic sensor being joined to the upper part.

The invention also relates to an arrangement comprising a system according to any of the above disclosed variants and at least a rail provided at least with a web and an upper flange, wherein the acoustic sensor is attached to the upper flange, on the downward oriented surface thereof.

The invention also relates to a vibration detector unit destined to be attached to a rail provided at least with a web and an upper flange, the vibration detection unit comprising an acoustic sensor and a box, the box comprising a lower part and an upper part, wherein the lower part defines a volume for housing components and is destined to be adjoined to the web and the upper part is a cover of the box, the upper part having an upper profile having the shape of the upper flange lower surface, the acoustic sensor being joined to the upper part.

In some embodiments, the vibration detector unit further comprises a processor which comprises stored patterns corresponding to known events or situations having associated patterns of acoustic vibrations in the rail, the processor being configured to preprocess the vibrations transmitted to the rail, to determine if the vibrations correspond to a stored pattern and, if the vibrations correspond to a stored pattern, send to an external control unit a signal associated to the event.

In some embodiments, the vibration detector unit further comprises attachment means to the web, the attachment means being embedded in a wall of the lower part and the attachment means comprising a magnet.

In some embodiments, the vibration detector unit further comprises two opposite end walls, one or both walls comprising a cable inlet.

In some embodiments, the vibration detector unit further comprises the walls or a lower portion thereof are inclined, such that the inlet(s) are oriented towards the ground when the box is attached to a rail.

In some embodiments, the vibration detector unit further comprises two internal walls that divide the volume in three separate volumes.

Finally, in some embodiments, the box is metallic.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as an example of how the invention can be carried out. The drawings comprise the following figures:

FIG. 3 shows in perspective an arrangement including a rail and a vibration detection unit attached thereof.

FIG. 4 is a frontal view of the arrangement shown in FIG. 3.

FIG. 5 is a schematic section through a cross section of the arrangement rail/vibration detection unit, specially aimed at showing how the cover of the box fits the contour of the downward oriented surface of the upper flange of the rail.

DESCRIPTION OF A WAY OF CARRYING OUT THE INVENTION

Figure 1:
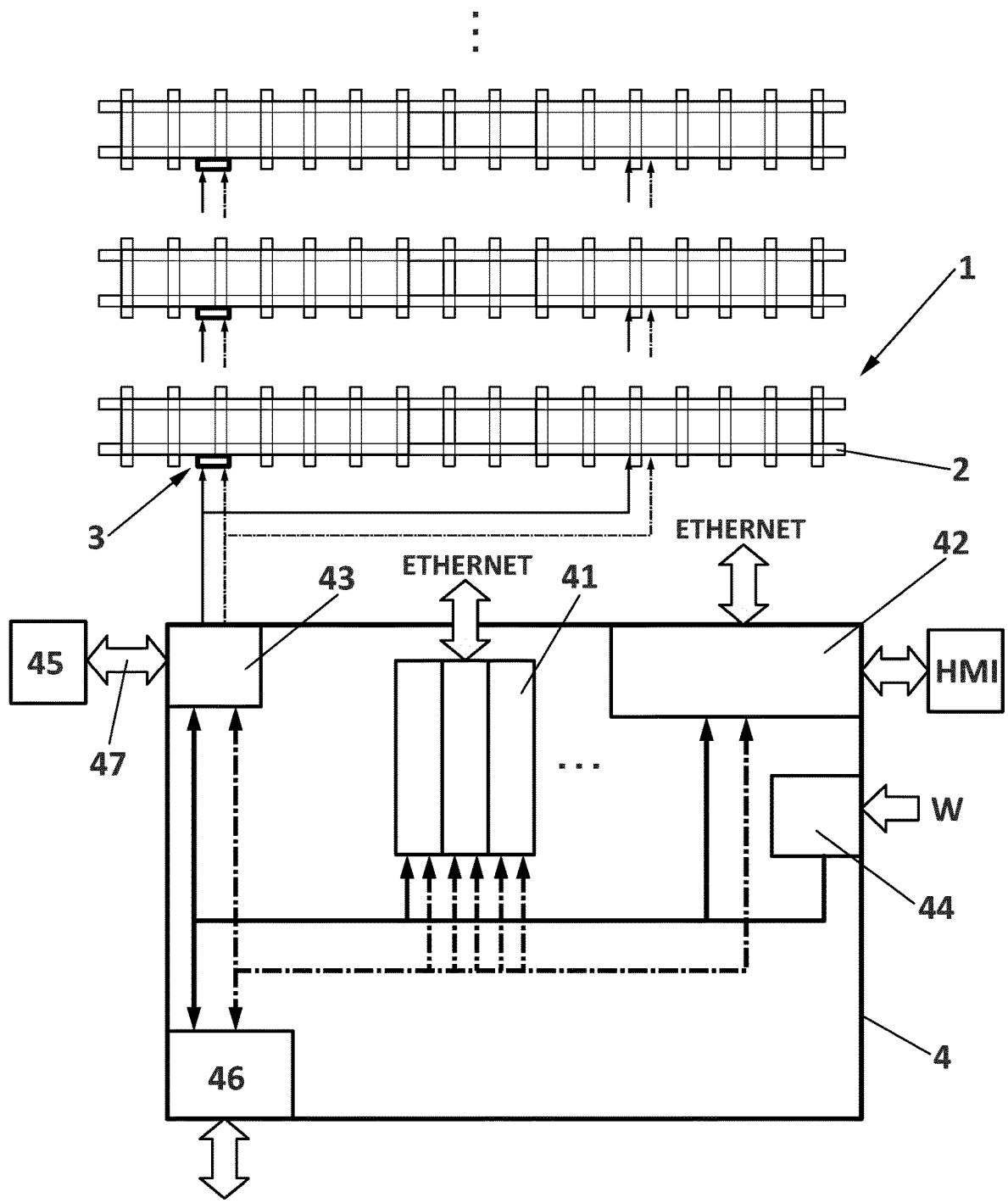
FIG. 1 shows a block diagram which shows the components of the main assembly, which is the component that receives the signals from the vibration detection units attached to the rails.

As shown in the figures, the present invention relates to a system 1 for detecting events or situations having associated patterns of acoustic vibrations in a train rail 2, which comprises at least a vibration detector unit 3 destined to be attached to the rail 2 such that it can sense the acoustic vibrations transmitted through the rail 2 and a main assembly 4 connected to the vibration detector unit 3, the vibration detector unit 3 comprising an acoustic sensor 31.

According to the present invention, the vibration detector unit 3 comprises a processor 32 and the main assembly 4 comprises a control unit 41.

The vibration detector unit 3 is destined to be attached to the rail 2, while the main assembly, which is a more delicate component, will be arranged for example in a nearby protected housing.

The processor 32 of the vibration detector unit 3 comprises stored patterns corresponding to known events, to which end it comprises memory means, and it is configured to preprocess the vibrations transmitted to the rail 2, to determine if the vibrations correspond to a stored pattern and, if the vibrations correspond to a stored pattern, send to the control unit 41 a signal associated to the event.

Therefore, the recollected signals can be already preprocessed before being sent to the main assembly and only relevant information will be sent to the main assembly.

Figure 2:
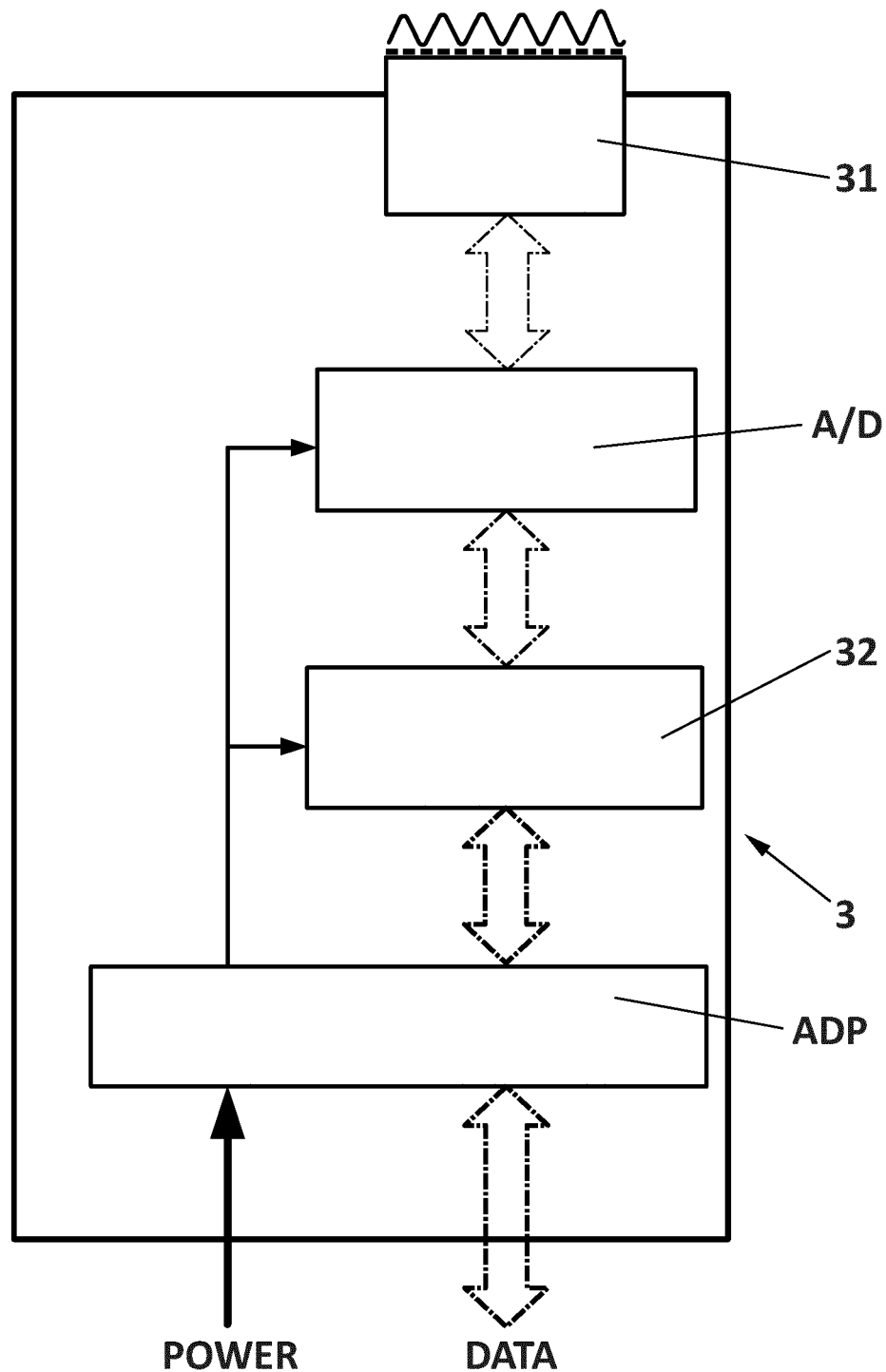
FIG. 2 shows a block diagram of a vibration detection unit.

The VDU further comprises an A/D converter and a power & data protection means ADP, as shown in FIG. 2.

The main assembly will be responsible for managing the information received form the VDU and according to its integration in the rail safety system, will send to other units 45 arranged downstream the information necessary for these other units 45 to issue warning signals or to act on elements of the tracks.

Maybe the signals will fit a pattern stored in the VDU or maybe not. In the latter case, the processor is configured to send to the control unit 41 the data associated with the vibrations for further analysis. This is equivalent to a safety mode.

The events or situations can include a broken rail, works on or near the rails, detecting derailment causing circulation of dragging equipment, rockslides, avalanches, presence of: rocks, snow, trees, mud, or circulation of vehicles with flat wheel defect and train approach. Of course, in normal conditions, the system will just inform about speeds, directions and distances of incoming railway vehicles.

The acoustic sensor 31 is an accelerometer, a microphone or a piezo electric sensor, and has a sensing range comprised between 0 and 140 KHz.

The system can comprise two vibration detector units 3, each one connected to one of the rails of a track. This particular arrangement allows comparing vibration patterns between rails, and thus the early detection of issues. That is, the absence of train vibrations in one rail when train vibrations are already present in the other rail are strong indicators of rail issues.

The vibration detector unit 3 and the main assembly 4 are interconnected, the connections being implemented with cables or wirelessly. In the figures, a cable connection is depicted.

The vibration detector unit 3 is powered through harvesting or by the main assembly 4 through cables and the main assembly 4 is powered through local grid, solar panels, wind power, any green energy resources. To this end it is provided with a power unit 44 destined to generate energy or receive power W form the outside.

The control unit 41 comprises a control card, the control card being arranged to be separately removed and changed. The control cards are components which are part of the control unit and are programmed to run application software for specific applications at a site of interest. Each site where the inventive system will be installed will have different needs/requirements.

Figure 14:
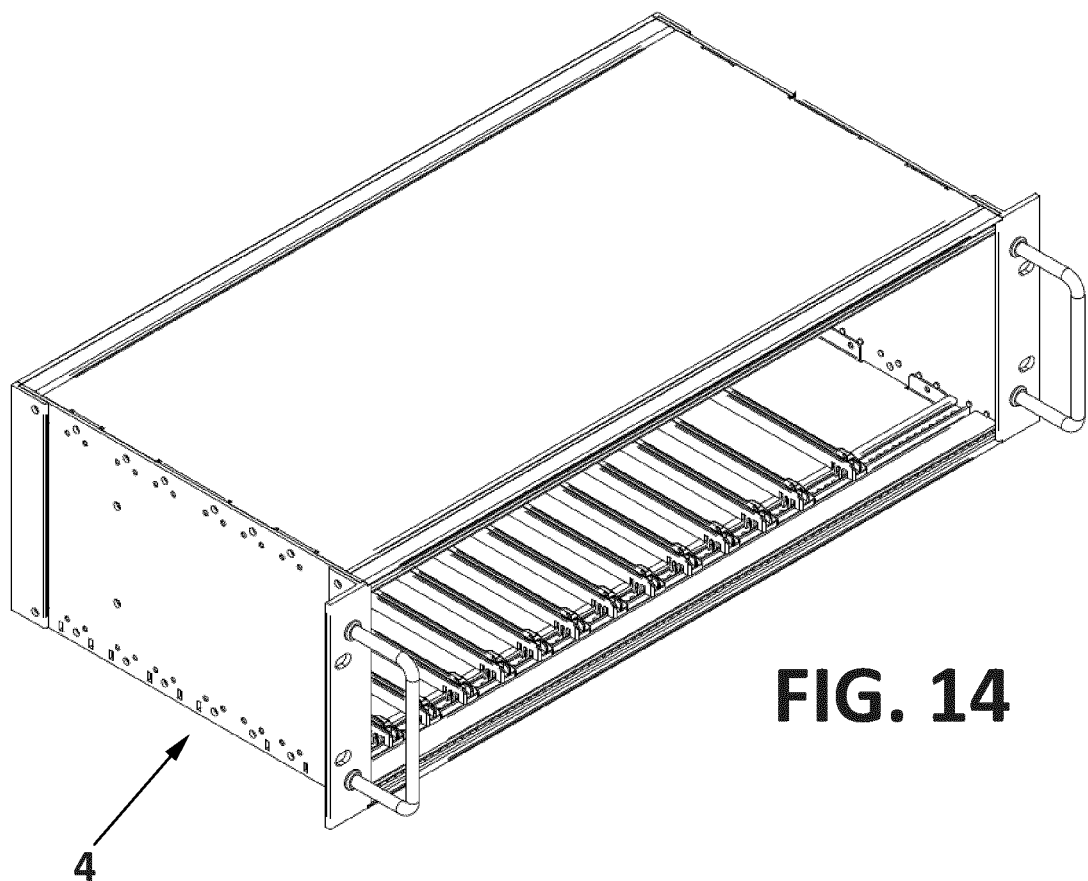
FIG. 14 shows the enclosure for the main assembly, with slots for removably housing the cards.
Figure 15:
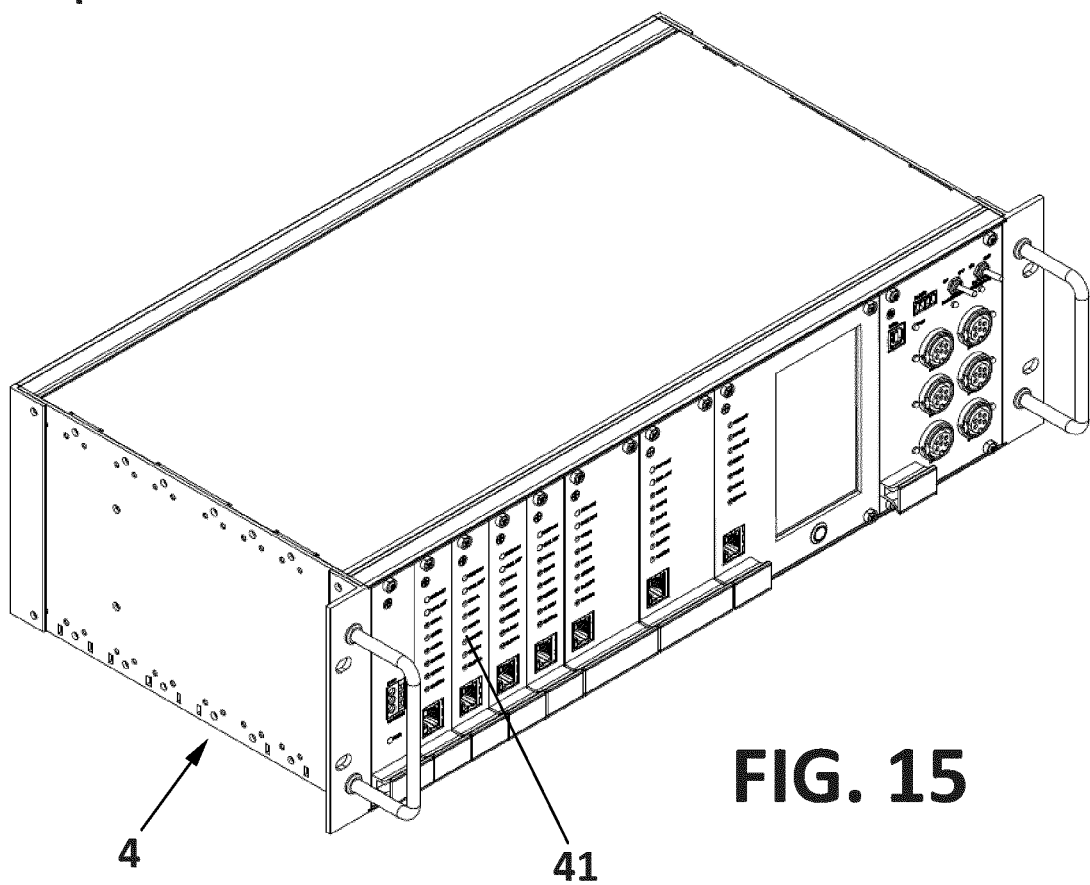
FIG. 15 shows the whole main assembly.

Each control card is an independent physical card connected in the main assembly by a bus and each control card can be separately removed and changed without the system needed to be recalibrated. FIGS. 14 and 15 shows the slots for the different control cards and different control cards inserted therein respectively.

The system is designed so that on-site programming is minimized and all programming is housed in pre-programmed interchangeable components, such as these control cards. This improves the quality of the system, since everything can be pre-programmed in the factory, improves the versatility and modularity of the system and prevents any unwanted intervention in the system. In general, the invention is concerned with its different aspects of providing a system with the greatest possible modularity, which consists of easily assembled modules.

Figure 16:
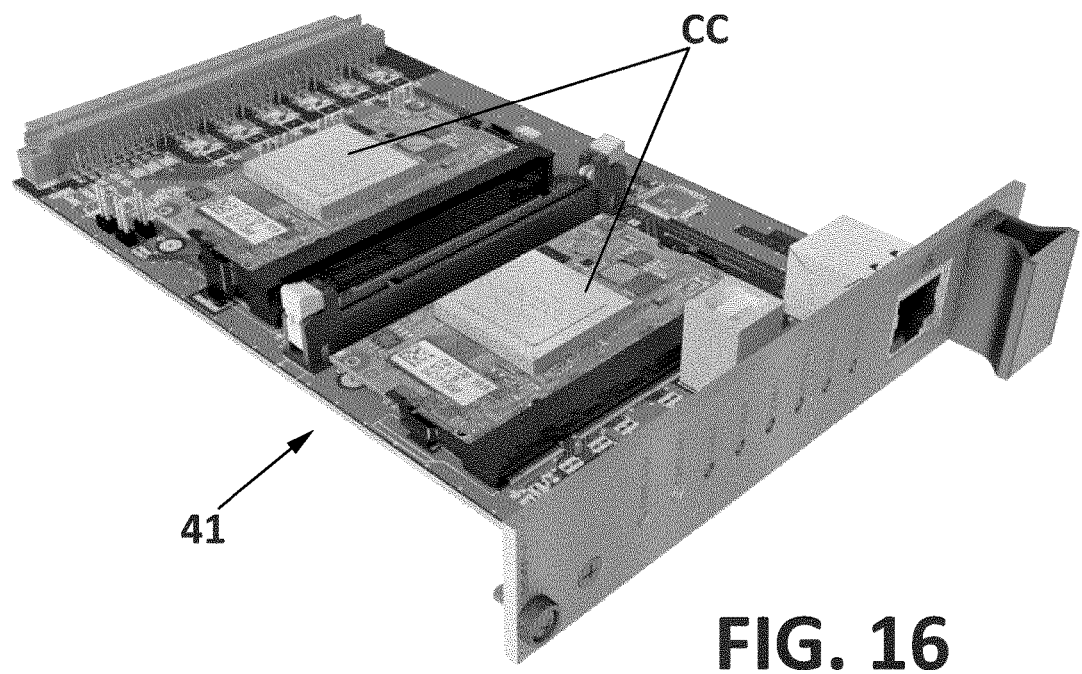
FIGS. 16 and 17 shows a replaceable control unit, provided in turn with replaceable control cards.
Figure 17:
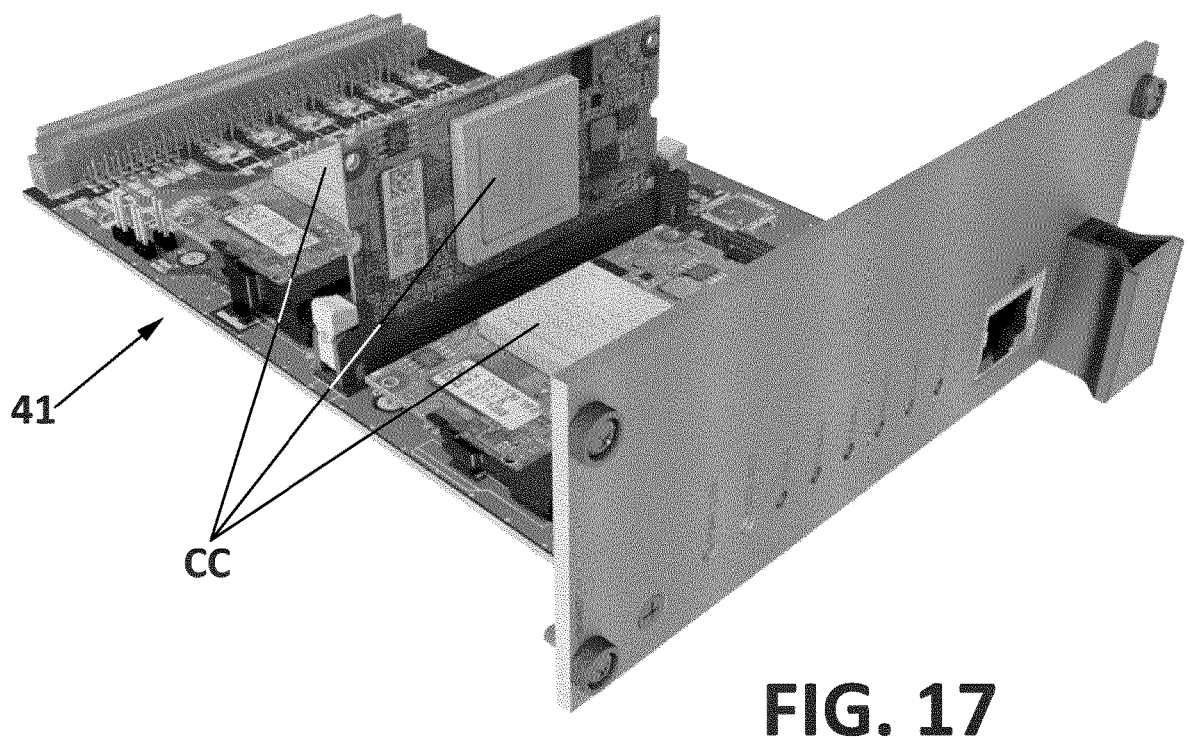
Figure 18:
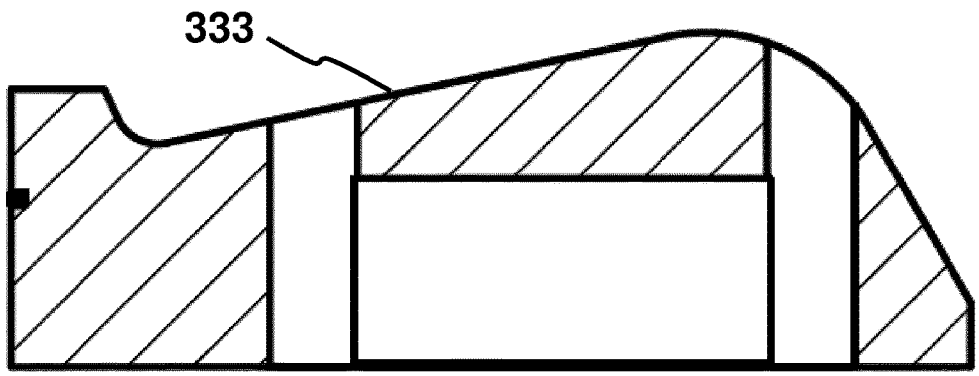
FIGS. 18 to 22 show various shapes of the upper part of the box, or cover, according to the invention, which are adapted to different normalized contours of the rail.
Figure 19:
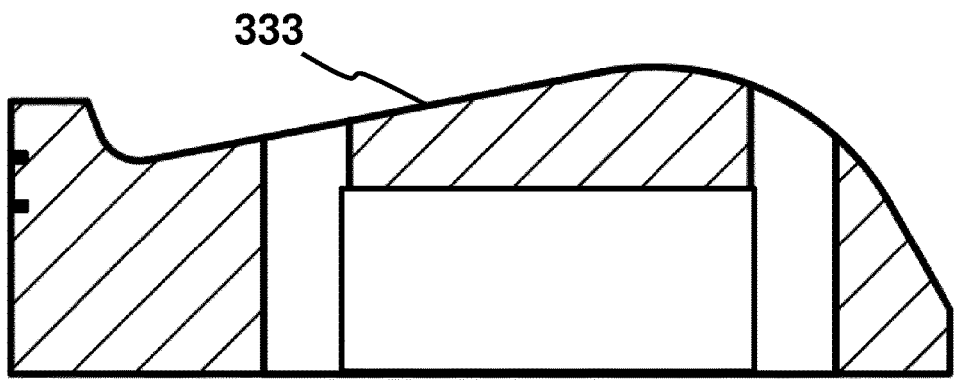
Figure 20:
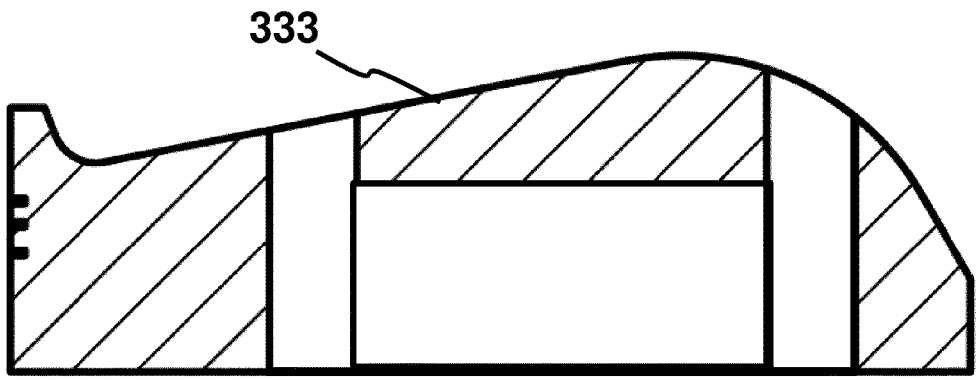
Figure 21:
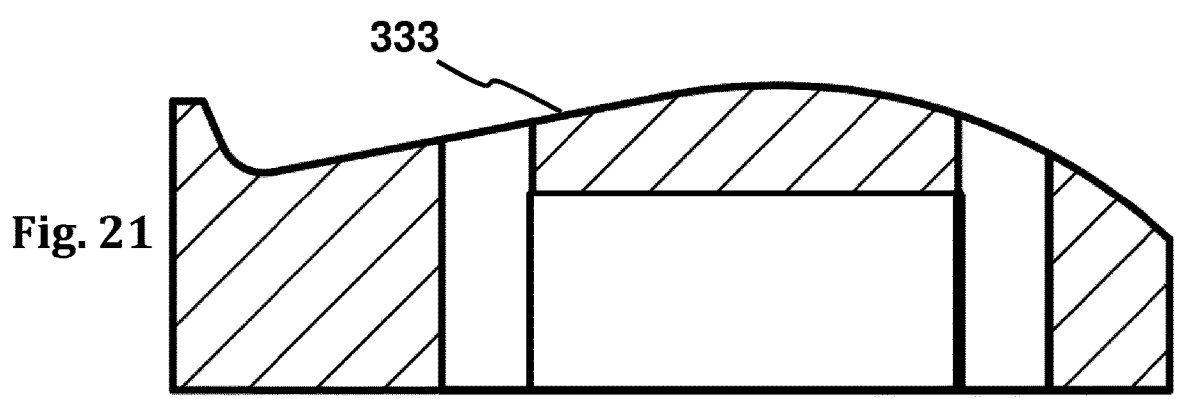
Figure 22:
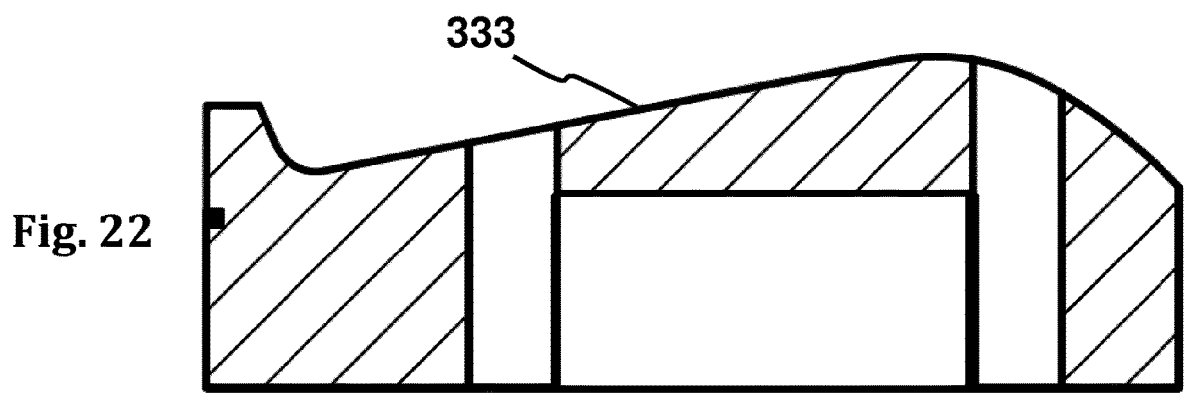

As shown in FIG. 16, the control cards CC are the units which have the core intelligence software and operate the application in question. FIG. 16 shows an embodiment of a replaceable control unit 4 with two control cards CC, whereas FIG. 17 shows an embodiment with three control cards CC. Each control card CC can operate independently and on both versions, there is one 1 master and either 1 or 2 slaves respectively. The functionality is that if the master control card in a control unit fails, then the other takes over immediately and the system sends out a failure message simultaneously.

As shown in FIG. 1, the main assembly further comprises a connection 47 to electro mechanical devices to be controlled 45, means for connecting the control units 41 and the information and diagnostics unit 42 to an Ethernet. It also comprises a connection to an interface HMI. Finally, it comprises a stacking unit 46 destined to allow the connection to another main assembly.

The main assembly 4 comprises an information and diagnosis unit 42 destined to display real time data about the system and its performance.

The main assembly 4 comprises an I/O unit 43 destined to route data coming from the vibration detection unit 3 outside of the system 1.

The sensors are connected on the same cable line without using a separate cable for the various types of sensors. This feature secures the minimum type and amount of cabling going from a sensor-chain into the main assembly.

The invention also refers to an arrangement comprising a system 1 according to any of the previous variants and at least a rail 2, wherein the acoustic sensor 31 is attached to the head of the rail 2, on the downward oriented surface 21 thereof, as shown in FIG. 3.

The invention also refers to a vibration detector unit 3 destined to be attached to a rail 2 provided at least with a web W and an upper flange F, as shown in FIG. 5.

The vibration detection unit 3 comprises a box 33 wherein the sensor 31 is enclosed.

The vibration detection unit is a component that will be subjected to very harsh and highly variable conditions. In addition, according to the part of the world where it is installed, the conditions will be very different. This is why a housing or box has been designed to accommodate any condition.

However, the robustness of this component must be compatible with ensuring good measurement conditions. That is to say, the sensor, which is a delicate component, must be protected and also be provided with an interface between sensor and rail that allows to obtain signals as reliable as possible. This is achieved with the characteristics that will be described below.

To this end, the box 33 comprises a lower part 332 and an upper part 331. The lower part 332 defines a volume V for housing components and is destined to be adjoined to the web W and the upper part 332 is a cover of the box 33, as shown in FIG. 5.

Figure 10:
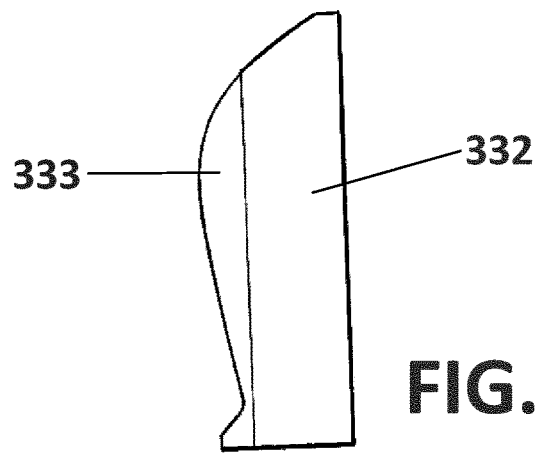
FIG. 10 is a lateral view of the upper part or cover, which shows that one side has a contour that matches the contour of the lower surface of the rail flange.

According to the present invention and as shown in FIG. 10, the upper part 332 has an upper profile 333 having the shape of the upper flange F lower surface, the acoustic sensor 31 being joined to the upper part 332.

As it is known, there are several different types of profiles in the railway industry. Therefore, instead of having various types of sensor houses, the present invention provides a unique solution which allows to have the same VDU housing, and instead only the cover needs to be changed, which matches perfectly the contour of the rail, so that the contact/interface surface is optimal this allowing to obtain very reliable measures. This is the part which is attached to the rail, and the sensor house can then be unchanged. This saves a huge amount of time in production, as well the need for spares and different models in stock.

FIGS. 18 to 22 show upper part 332 sections having an upper profile 333 that fits exactly to many existing normalized contours.

Also, the enclosure shown in the figures meets the IP68 level, as it is defined in the CEI 60529 Degrees of Protection standard.

The vibration detector further comprises the processor 32 which comprises stored patterns corresponding to known events or situations having associated patterns of acoustic vibrations in the rail 2.

As already explained above when disclosing the whole system, the processor 32 is configured to preprocess the vibrations transmitted to the rail 2, to determine if the vibrations correspond to a stored pattern and, if the vibrations correspond to a stored pattern, send to an external control unit 41 a signal associated to the event.

Figure 6:
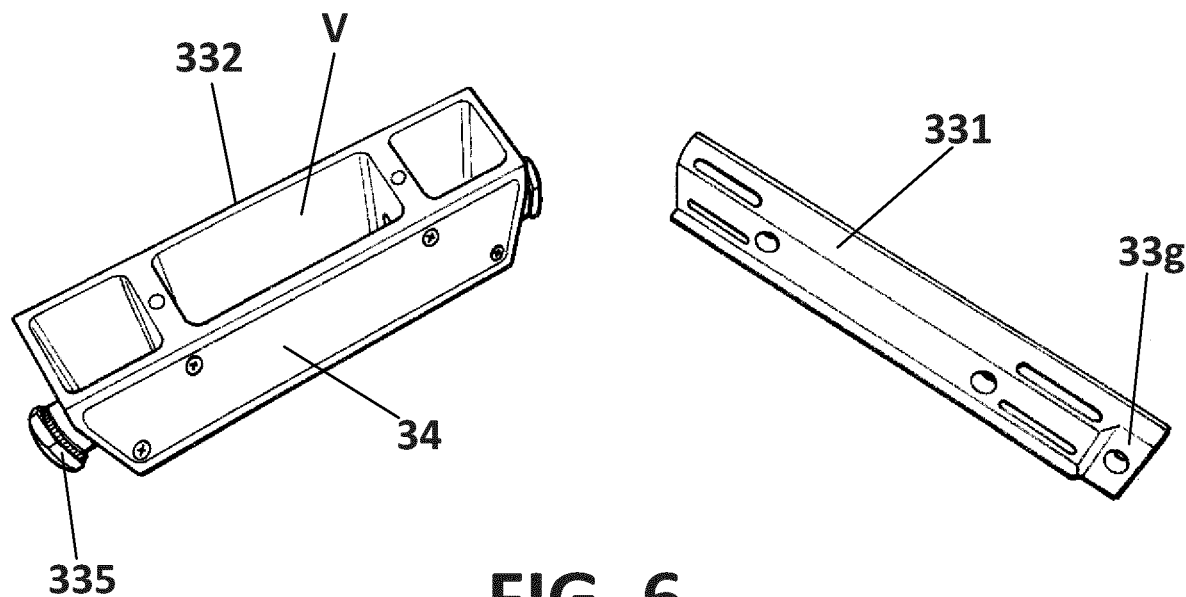
FIG. 6 shows the lower and upper parts of the housing.
Figure 7:
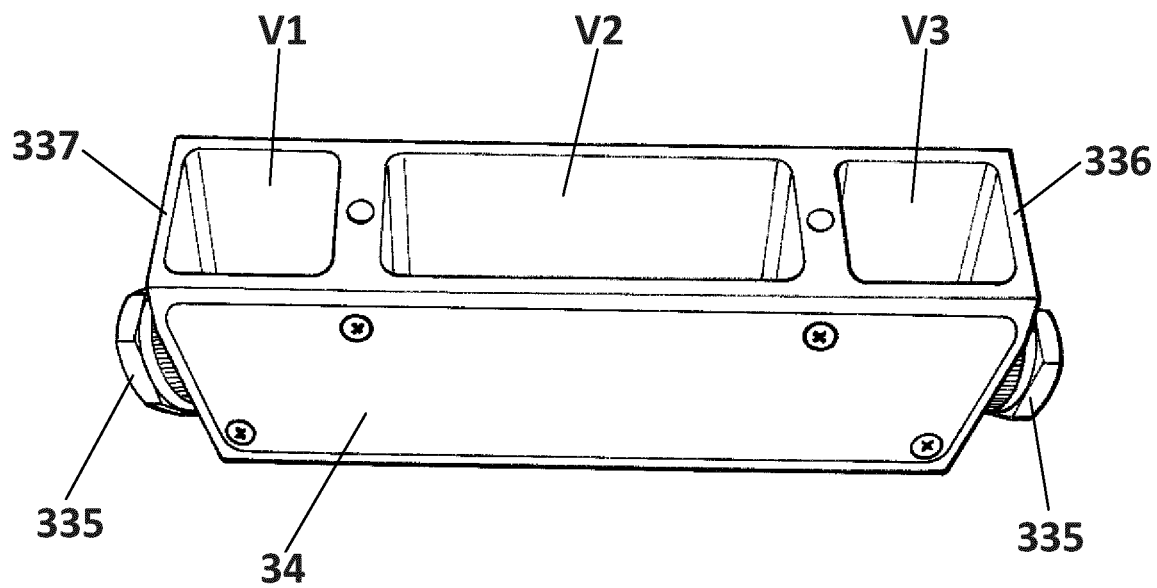
FIG. 7 shows the lower part of the housing.
Figure 8:
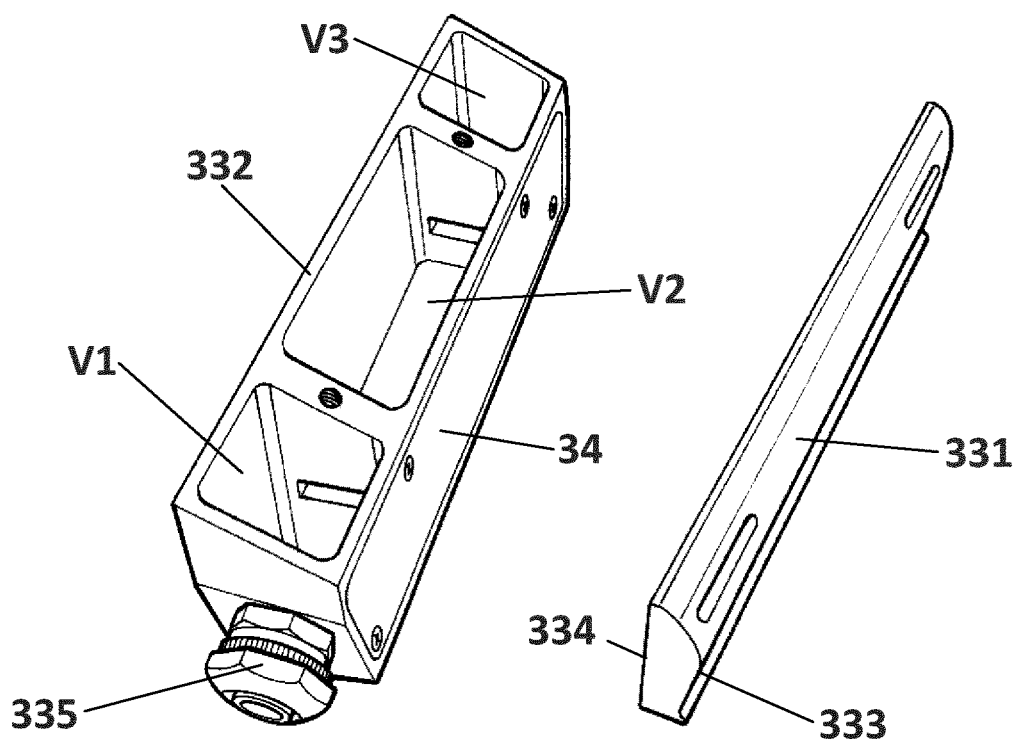
FIG. 8 is another view of the two components that made up the box.

The vibration detector unit comprises attachment means 34 to the web W, the attachment means 34 being embedded in a wall of the lower part 331 and the attachment means 34 comprising a magnet, as shown in FIG. 7. This allows to attach the VDU easily without intervention on the rail 2. The great area of the magnet 34 provides a strong adhesion. In order to allow the VDU to be separated from the rail a recess 339 is provided on and end of the cover 331, as shown in FIG. 6, which allows introducing a tool that can act a as a lever.

The vibration detector unit comprises two opposite end walls 336, 337, one or both walls 336, 337 comprising a cable inlet 335.

The possibility of having two inlets for cables on both sides allows for a simpler physical structural topology. That is, instead of having a cable connecting each VDU to the MA, it is possible to concatenate VDUs. Said with other words, the present solution allows having more sensors on the same cable, and then adding them into a chain. This gives no need to have 1 cable per sensor, and the installation does not need to have more than 1 cable tube into the ground.

Figure 9:
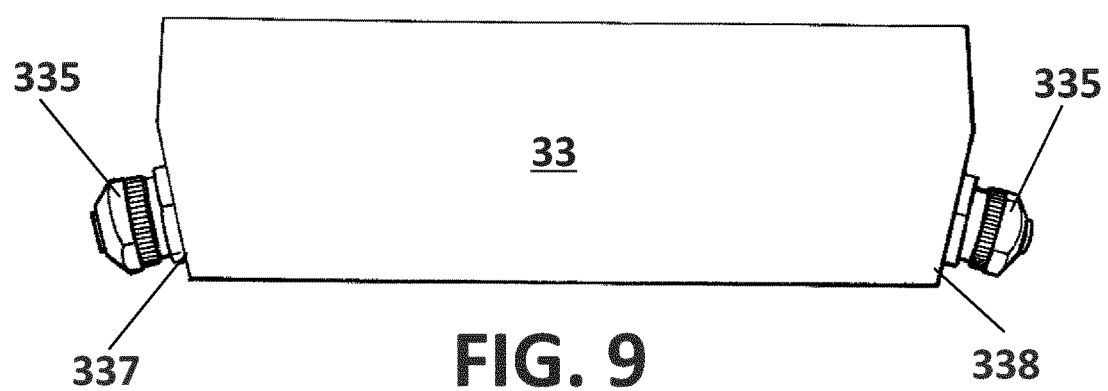
FIG. 9 is a lateral view that allows appreciating that the lower portion of the end walls is inclined.

The walls or a lower portion thereof are inclined, as shown in the FIG. 9 frontal elevation view, such that the inlets 335 are oriented towards the ground when the box is attached to a rail 2. This allows for better directing the cables towards the ground.

The vibration detector unit comprises two internal walls that divide the volume V in three separate volumes V1, V2, V3, as shown in FIG. 7.

This is for EMC protection and making sure that there is no leakage of signals out from the sensor into the rail. Railways are often scared to have interferences. Also, it is for surge protection and lightning protection. Another factor is that it provides a shield from where the cable connectors are, and into the compartment where the electronic components and piezo element are located.

The system includes a warning in case someone tries to separate the box from the rail, which is a very easy operation by applying a lever between the rail and the cover.

Figure 11:
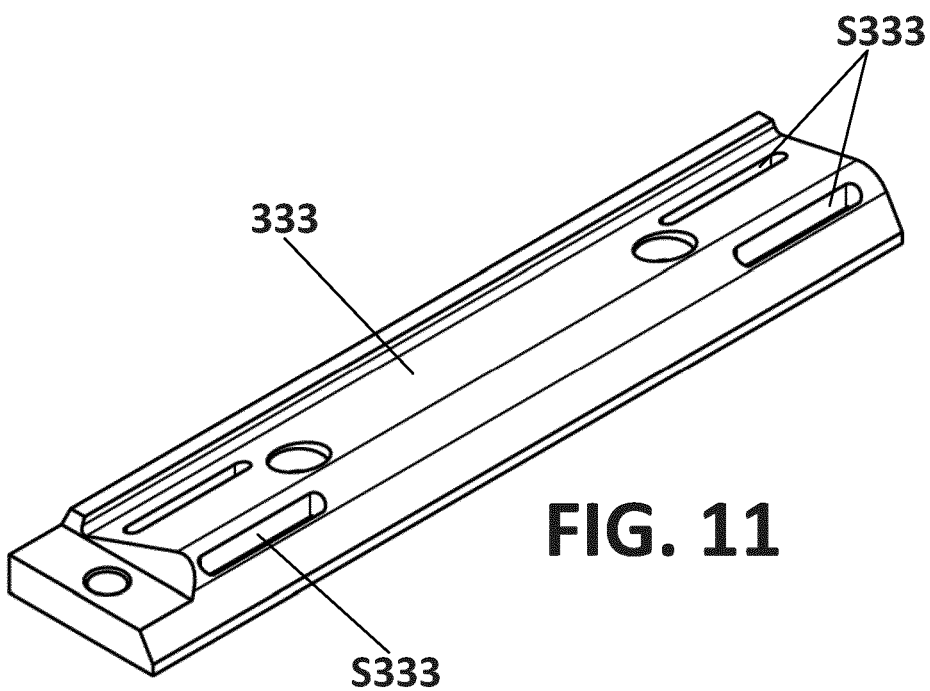
FIGS. 11 and 12 show two different covers, having different contours, adapted for two types of standard rails.
Figure 12:
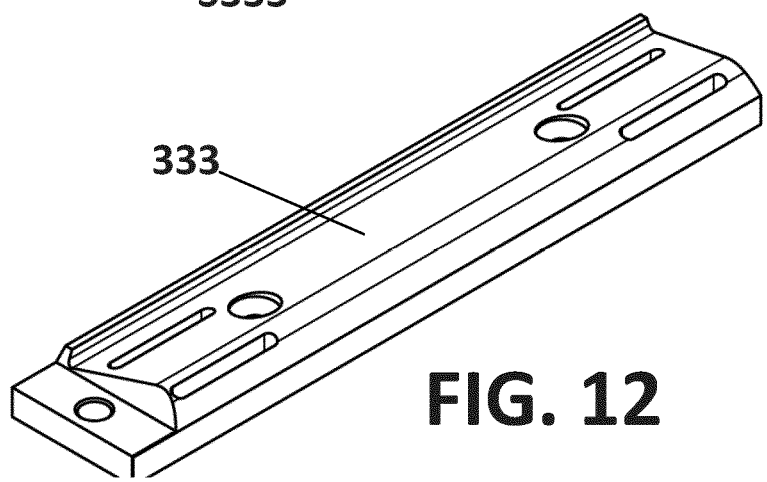
Figure 13:
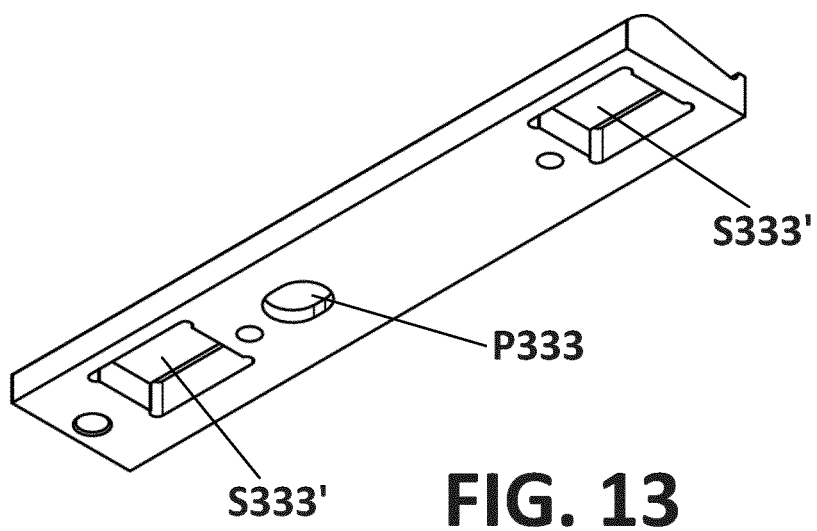
FIG. 13 shows a perspective view of the cover from its lower side, which is the same for all the types of rails, since it has to fit the lower part of the housing, which is also common for the different types of rails.

As shown in FIG. 11 or FIG. 12, the upper body 331 or cover comprises slots S333 on the attaching surface 333, destined to house pole extensions of attaching magnets. The magnets are inserted in recesses S333', located on the other side. The cover 331 further comprises a recess P333 for housing the sensitive component of the sensor, for example the piezo component.

In this text, the term "comprises" and its derivations such as "comprising", etc. should not be understood in an excluding sense, that is, these terms should not be interpreted as excluding the possibility that what is described and defined may include further elements.

The invention is obviously not limited to the specific embodiments described herein, but also encompasses any variations that may be considered by any person skilled in the art within the general scope of the invention as defined in the claims.

The invention claimed is:

1. A system (1) for detecting events or situations having associated patterns of acoustic vibrations in a train rail (2), which comprises at least one vibration detector unit (3) configured to be attached to the rail (2) such that it can sense the acoustic vibrations transmitted through the rail (2) and a main assembly (4) connected to the vibration detector unit (3), the vibration detector unit (3) comprising an acoustic sensor (31), characterised in that the vibration detector unit (3) comprises a processor (32) and the main assembly (4) comprises a control unit (41), the processor (32) comprising stored patterns corresponding to known events, the processor (32) being configured to preprocess the vibrations transmitted to the rail (2), to determine if the vibrations correspond to a stored pattern and, if the vibrations correspond to a stored pattern, send to the control unit (41) a signal associated to the event wherein the vibration detection unit (3) is enclosed in a box (33) comprising a lower part (331) and an upper part (332), wherein the lower part (331) defines a volume (V) for housing components and is configured to be adjoined to an upper web (W) of the rail (2) and the upper part (332) is a cover of the box (33), the upper part (332) having an upper profile (333) having the shape of an upper flange (F) lower surface of the rail (2), the acoustic sensor (31) being joined to the upper part (332).

2. The system according to claim 1, wherein the processor is configured to send to the control unit (41) the data associated with the vibrations for further analysis if the vibrations do not correspond to a stored pattern.

3. The system according to claim 1, w herein the events or situations comprises at least one of:
broken rail;
works on or near the rails;
detecting derailment causing circulation of dragging equipment;
rockslides;
avalanches;
circulation of vehicles with flat wheel defect; and
train approach.

4. The system according to claim 1, wherein the acoustic sensor (31) is an accelerometer, a microphone or a piezo electric sensor.

5. The system according to claim 1, wherein the acoustic sensor (31) has a sensing range comprised between 0 and 140 KHz.

6. The system according to claim 1, wherein the at least one vibration detector unit comprises two vibration detector units, each connected to the rail.

7. The system according to claim 1, wherein the vibration detector unit (3) and the main assembly (4) are interconnected, the connections being implemented with cables or wirelessly.

8. The system according to claim 1, wherein the vibration detector unit (3) is powered through harvesting or by the main assembly (4) through cables and the main assembly (4) is powered through local grid, solar panels or wind power.

9. The system according to claim 1, wherein the control unit (41) comprises a control card, the control card being arranged to be separately removed and changed.

10. The system according to claim 1, wherein the main assembly (4) comprises an I/O unit (43) configured to route data coming from the vibration detection unit (3) to outside the system (1).

11. The system according to claim 1, wherein the vibration detection unit (3) comprises a temperature sensor.

12. An arrangement comprising a system (1) according to claim 1 and at least a rail (2) provided at least with a web (W) and an upper flange (F), characterised in that the acoustic sensor (31) is attached to the upper flange (F), on the downward oriented surface (21) thereof.

13. A vibration detector unit (3) configured to be attached to a rail (2) provided at least with a web (W) and an upper flange (F), the vibration detection unit (3) comprising an acoustic sensor (31) and a box (33), the box (33) comprising a lower part (331) and an upper part (332), characterised in that the lower part (331) defines a volume (V) for housing components and is configured to be adjoined to the web (W) and the upper part (332) is a cover of the box (33), the upper part (332) having an upper profile (333) having the shape of the upper flange (F) lower surface, the acoustic sensor (31) being joined to the upper part (332).

14. The vibration detector unit according to claim 13, further comprising a processor (32) which comprises stored patterns corresponding to known events or situations having associated patterns of acoustic vibrations in the rail (2), the processor (32) being configured to preprocess the vibrations transmitted to the rail (2), to determine if the vibrations correspond to a stored pattern and, if the vibrations correspond to a stored pattern, send to an external control unit (41) a signal associated to the event.

15. The vibration detector unit according to claim 13, further comprising attachment means (34) to the web (W), the attachment means (34) being embedded in a wall of the lower part (331) and the attachment means (34) comprising a magnet.

16. The vibration detector unit according to claim 13, wherein the box comprises two opposite end walls (336, 337), one or both walls (336, 337) comprising a cable inlet (335).

17. The vibration detector unit according to claim 16, wherein the walls or a lower portion thereof are inclined, such that the inlet(s) are oriented towards the ground when the box is attached to a rail (2).

18. The vibration detector unit according to claim 13, wherein the box comprises two internal walls that divide the volume (V) in three separate volumes (V1, V2, V3).

19. The vibration detector unit according to claim 13, wherein the box (33) is metallic.

* * * * *